United States Patent
Rao et al.

(10) Patent No.: US 10,650,810 B2
(45) Date of Patent: May 12, 2020

(54) DETERMINING PHONETIC RELATIONSHIPS

(71) Applicant: Google LLC, Mountain View, CA (US)

(72) Inventors: Nikhil Chandru Rao, Santa Clara, CA (US); Saisuresh Krishnakumaran, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/342,718

(22) PCT Filed: Sep. 29, 2017

(86) PCT No.: PCT/US2017/054419
§ 371 (c)(1),
(2) Date: Apr. 17, 2019

(87) PCT Pub. No.: WO2018/075224
PCT Pub. Date: Apr. 26, 2018

(65) Prior Publication Data
US 2019/0295531 A1    Sep. 26, 2019

Related U.S. Application Data

(60) Provisional application No. 62/410,564, filed on Oct. 20, 2016.

(51) Int. Cl.
*G10L 15/10* (2006.01)
*G10L 15/187* (2013.01)
(Continued)

(52) U.S. Cl.
CPC .......... *G10L 15/187* (2013.01); *G06F 40/194* (2020.01); *G06F 40/289* (2020.01);
(Continued)

(58) Field of Classification Search
CPC ....... G10L 13/08; G10L 15/063; G10L 13/06; G10L 15/187; G10L 15/26; G10L 13/02;
(Continued)

(56) References Cited

U.S. PATENT DOCUMENTS 6,185,530 B1    2/2001    Ittycheriah et al.
6,823,309 B1 *  11/2004   Kato ........................ G10L 13/10
                                                           704/267

(Continued)

FOREIGN PATENT DOCUMENTS

GB    2376554       12/2002
KR    101579544     12/2015

OTHER PUBLICATIONS

Roe et al.; Prediction of Word Confusabilities for Speech Recognition; ICSLP 94: 1994 International Conference of Spoken Language Processing; Japan; 4 pages; dated Sep. 18, 1994.
(Continued)

*Primary Examiner* — Vijay B Chawan
(74) *Attorney, Agent, or Firm* — Middleton Reutlinger (57) ABSTRACT

Systems and methods of determining phonetic relationships are provided. For instance data indicative of an input text phrase input by a user can be received. An audio output corresponding to a spoken rendering of the input text phrase can be determined. A text transcription of the audio output of the input text phrase can be determined. The text transcription can be a textual representation of the audio output. The text transcription can be compared against a plurality of test phrases to identify a match between the text transcription and at least one test phrase.

15 Claims, 4 Drawing Sheets

(51) Int. Cl.
| | |
|---|---|
| *G10L 15/22* | (2006.01) |
| *G10L 15/30* | (2013.01) |
| *G10L 25/51* | (2013.01) |
| *G10L 13/00* | (2006.01) |
| *G10L 15/26* | (2006.01) |
| *G06F 40/194* | (2020.01) |
| *G06F 40/289* | (2020.01) |

(52) U.S. Cl.
CPC .............. *G10L 13/00* (2013.01); *G10L 15/22* (2013.01); *G10L 15/26* (2013.01); *G10L 15/30* (2013.01); *G10L 25/51* (2013.01)

(58) Field of Classification Search
CPC ......... G10L 13/04; G10L 15/08; G10L 15/10; G10L 25/00; G10L 25/30; G10L 13/07; G10L 15/01; G10L 15/02; G10L 15/04; G10L 15/07; G10L 15/12; G10L 15/18; G10L 15/1807; G10L 15/1815; G06F 17/273; G06F 17/2785; G06F 17/2795
USPC ....... 704/235, 255, 260, 266, 236, 243, 251, 704/254, 256, 267, 7, 9
See application file for complete search history.

(56) References Cited

U.S. PATENT DOCUMENTS

| | | | | |
|---|---|---|---|---|
| 7,013,276 | B2* | 3/2006 | Bickley | G10L 15/08 704/255 |
| 7,472,061 | B1* | 12/2008 | Alewine | G10L 13/08 704/243 |
| 9,508,338 | B1* | 11/2016 | Kaszczuk | G10L 13/02 |
| 9,978,359 | B1* | 5/2018 | Kaszczuk | G10L 13/02 |
| 2003/0069729 | A1* | 4/2003 | Bickley | G10L 15/08 704/236 |
| 2005/0080613 | A1* | 4/2005 | Colledge | G06F 17/2785 704/9 |
| 2005/0182629 | A1* | 8/2005 | Coorman | G10L 13/06 704/266 |
| 2006/0149558 | A1* | 7/2006 | Kahn | G10L 15/063 704/278 |
| 2007/0055526 | A1* | 3/2007 | Eide | G10L 13/10 704/260 |
| 2009/0248395 | A1* | 10/2009 | Alewine | G10L 13/08 704/7 |
| 2011/0218806 | A1* | 9/2011 | Alewine | G10L 13/08 704/251 |
| 2012/0179694 | A1* | 7/2012 | Sciacca | G06F 16/3338 707/748 |
| 2013/0262096 | A1* | 10/2013 | Wilhelms-Tricarico | G10L 25/90 704/202 |
| 2015/0081293 | A1* | 3/2015 | Hsu | G10L 15/26 704/235 |
| 2015/0081294 | A1* | 3/2015 | Hsu | G10L 15/26 704/235 |
| 2017/0206889 | A1* | 7/2017 | Lev-Tov | G10L 15/01 |

OTHER PUBLICATIONS

European Patent Office—International Searching Authority; International Search Report and the Written Opinion of PCT Serial No. PCT/US2017/054419; 9 pages; dated Aug. 1, 2018.

European Patent Office; Intention to Grant issued in Application No. 17781362.3 dated Aug. 1, 2019.

United Kingdom Intellectual Property Office; Examination Report under Section 18(3) of Application No. GB1716855; 4 pages; dated Feb. 7, 2020.

* cited by examiner

DETERMINING PHONETIC RELATIONSHIPS

FIELD

The present disclosure relates generally to determining phonetic relationships between two or more phrases.

BACKGROUND

Speech recognition has become a widely adopted and frequently used mode of interacting with computing devices. Speech input may be more convenient and efficient than traditional input modes such as typing through a keyboard. For example, mobile computing devices may offer speech recognition services as an alternative input mode to typing characters through a virtual keyboard on a touchscreen. Some computing devices are configured to accept voice commands from a user, for instance, as a shortcut to performing certain actions on the computing device. In this manner, such computing devices can be configured to interpret the voice commands, and to perform one or more actions based on the voice command interpretations.

In some instances, developers of computing applications or services can select voice commands that can be used by one or more users to invoke the computing application or service on a computing device. It can be important to ensure that such selected voice commands are phonetically distinct from other voice commands already reserved to invoke other computing applications or services. In this manner, it can be beneficial to indicate to a developer or other party whether a voice command selected by the developer or other party is phonetically similar to one or more reserved voice commands.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining a phonetic relationship between two or more phrases. The method includes receiving, by one or more computing devices, data indicative of an input text phrase input by a user. The method further includes determining, by the one or more computing devices, an audio output corresponding to a spoken rendering of the input text phrase. The method further includes determining, by the one or more computing devices, a text transcription of the audio output of the input text phrase. The text transcription includes a textual representation of the audio output. The method further includes comparing, by the one or more computing devices, the text transcription against a plurality of test phrases to identify a match between the text transcription and at least one test phrase.

Other example aspects of the present disclosure are directed to systems, apparatus, tangible, non-transitory computer-readable media, user interfaces, memory devices, and electronic devices for determining phonetic relationships.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to determining a phonetic relationship between two or more phrases. As used herein, the term "phrase" can be defined as a sequence of one or more letters. For instance, a phrase can contain a sequence of letters that make up one or more words. An input text phrase can be converted to an audio output corresponding to a synthesized speech rendering of the input text phrase. A text transcription of the audio output can then be determined, for instance, using speech recognition techniques. The text transcription can then be compared to a plurality of test phrases to determine an exact match between the text transcription and one or more of the plurality of test phrases. If no exact match is found, it can be determined that the input text phrase is phonetically distinct from each of the test phrases. In this manner, the audio output of the input text phrase can represent a phonetic pronunciation of the input text phrase. By converting the input text phrase to the audio output, and subsequently converting the audio output to a text format, a textual representation of the phonetic pronunciation of the input text phrase (e.g. the text transcription) can be determined.

In some implementations, example aspects of the present disclosure can be implemented within, or otherwise associated with, a voice command verification system. In this manner, a determination of the phonetic relationship between two or more phrases according to example aspects of the present disclosure can be used to determine whether a proposed voice command is an authorized voice command that is phonetically distinct from a plurality of reserved voice commands (e.g. test phrases) already in use by a computing platform. In this manner, it can be ensured that a single voice command (or multiple phonetically similar voice commands) is not used to invoke multiple computing applications or services associated with the computing platform. As such, the number of operations performed by the computing platform can be reduced, for example, an operation performed by an unintentionally invoked application, or an operation to request clarification of a voice command by a user and processing of the reply. The operation of the processor of the computing platform can be reduced and consequently a power consumption of the computing platform can be reduced.

As one particular example, an input text phrase of "profit" can be input by a user. The input text phrase can be converted to an audio output corresponding to a synthesized speech rendering of the word "profit." A text transcription of the audio output can be determined. For instance, the text transcription can be a transcription that reads as "prophet," which is a homophone (e.g. phonetically similar) to the word "profit." The text transcription can be compared against a list of test phrases to identify a match between the text transcription and one or more of the test phrases. If the list of test phrases includes the word "prophet," a match can be found, and the input text phrase, "profit," can be identified as being phonetically similar to the word "prophet," as found in the list of test phrases.

More particularly, the input text phrase can be a sequence of one or more words input by a user in text form. The input text phrase can be input by a user, for instance, using a keyboard (e.g. touch keyboard or physical keyboard) or keypad associated with a user computing device, such as a smartphone, tablet, laptop computing device, desktop computing device, wearable computing device or other suitable user device. The input text phrase can be converted to an audio output of artificially produced speech corresponding to the input text phrase. The audio output can be an audio waveform configured for playback by an audio playout device. The input text phrase can be converted to the audio output using various suitable speech synthesis or text-to-speech techniques.

For instance, in some implementations, converting the input text phrase to an audio output can include determining a phonetic transcription of the input text phrase corresponding to a symbolic representation of how a spoken rendering of the text should sound. The phonetic transcription can include a sequence of phonetic speech units, such as phonemes, phones or other suitable phonetic speech units. A phonetic speech unit can correspond to an acoustic representation of a segment of speech. In some implementations, the input text phrase can be broken down into a sequence of words, and each word in the input text phrase can be converted to a sequence of phonemes to determine the phonetic transcription. In some implementations, each word of the input text phrase can be converted to a sequence of graphemes. As will be understood by those skilled in the art, a grapheme generally refers to the smallest unit of a writing system of a given language. The graphemes can then be converted to a sequence of phonemes to determine the phonetic transcription. In some implementations, one or more prosodic features (e.g. features associated with linguistic functions such as intonation, tone, stress, rhythm, etc.) of the input text phrase can further be determined.

The phonetic transcription can then be mapped to an audio output corresponding a spoken rendering to the phonetic transcription. In some implementations, the phonetic transcription can be mapped to the corresponding audio output based at least in part on the prosodic features associated with the phonetic transcription. For instance, in some implementations, the phonetic transcription can be mapped to one or more acoustic features corresponding to an acoustic rendering of the phonetic transcription. The acoustic features can take the form of feature vectors (e.g. Mel Frequency Cepstral Coefficients, or other suitable feature vectors), which include quantifiable properties of speech waveforms, such as for instance, frequencies and spectral powers. The acoustic features can then be transformed to physical properties representing a speech waveform of the acoustic features. The audio output can be generated as an audio file that can be stored or recorded on computer-readable media. For instance, the audio file can be suitable for subsequent playback of the audio file by an audio playout device. It will be appreciated that various suitable speech synthesis techniques can be used to map the phonetic transcription to the audio output, such as for instance, concatenation synthesis, unit selection synthesis, diphone synthesis, domain-specific synthesis, format synthesis, articulatory synthesis, hidden Markov models (HMM) based synthesis, sinewave synthesis, and/or other suitable speech synthesis techniques.

The audio output can subsequently be converted to a text format using one or more suitable speech recognition techniques. In this manner, a text transcription of the audio output can be determined. In particular, determining the text transcription can include determining one or more acoustic features associated with the audio output. For instance, the audio output can be segmented into a plurality of segments, and one or more acoustic features (e.g. feature vectors) can be determined for each segment. The feature vectors can be mapped to one or more phonemes. Data indicative of the mapped phonemes and/or the feature vectors can be provided to one or more language models (e.g. n-gram language models, or other suitable language models). The one or more language models can be used to determine the transcription of the audio output. In some implementations, the text transcription can be provided to a general or baseline language model. Such general language model can include a plurality of commonly used phrases. The general language model can further include probability estimates associated with the each phrase. The probability estimates can specify an estimate of the probability of occurrence of each phrase in a given sequence. In this manner, the general language model can define an estimated probability of an occurrence of word given one or more previously uttered words. In some implementations, one or more acoustic models (hidden Markov models, neural networks, etc.) can further be used to determine the transcription of the audio output. Such acoustic models can define statistical relationships between a plurality of audio signals and phonetic speech units).

In some implementations, determining the transcription of the audio output can include providing data indicative of the determined feature vectors and/or mapped phonemes to a biased or specialized language model. For instance, the biased language model can be generated by biasing the general language model towards a plurality of test phrases. In particular, the biased language model can be generated by increasing the probability estimates of the phrases included in the plurality of test phrases. In this manner, the biased language model can specify an increased estimated probability of occurrence of the test phrases.

In this manner, the text transcription of the audio output can be determined based at least in part on the biased language model and/or the general language model. In some implementations, a first transcription can be determined using the general language model and a second transcription can be determined using the biased language model. In particular, a first confidence recognition score can be determined for the first transcription and a second confidence recognition score can be determined for the second transcription. The confidence recognition scores can respectively specify an estimated confidence of the accuracy of the transcriptions. A transcription can be selected based at least in part on the confidence recognition scores. For instance, the selected transcription can be the transcription with the higher confidence recognition score. In some implementations, multiple text transcriptions can be determined and selected representing alternative spellings of one or more words in the transcriptions. For instance, in continuing the above example using the input text phrase of "profit," a first text transcription of the word "profit" can be selected and a second text transcription of the word "prophet" can be selected.

Upon determining the text transcription of the audio output, the text transcription can be compared against the plurality of test phrases to determine if the text transcription is included in the plurality of test phrases. In implementations wherein multiple text transcriptions are selected, each text transcription can be compared against the plurality of test phrases. In this manner, the plurality of test phrases can be searched to determine a direct match between one or more of the test phrases and the text transcription. If no direct match is found, it can be determined that the input text phrase is phonetically distinct from the plurality of test phrases. If a direct match is found, it can be determined that the input text phrase is phonetically the same as, or similar to, the one or more test phrases.

In some implementations, if a direct match is found between the text transcription and one or more test phrases, a phonetic distance between the input text phrase and the text transcription can be determined. The phonetic distance can be determined to determine whether the input text phrase is phonetically similar to the text transcription. Such determination of the phonetic distance can be used to verify the determination that the input text phrase is phonetically the same as, or similar to, the one or more test phrases. In this manner, if the input text phrase is phonetically similar to the text transcription, it can be determined that, because the text transcription was determined to be phonetically the same as the one or more test phrases, and the input text phrase was determined to be phonetically similar to the text transcription, the input text phrase is phonetically similar to the one or more test phrases.

The phonetic distance can be determined by converting the input text phrase and the text transcription to respective phoneme sequences. In particular, a first phoneme sequence can be determined for the input text phrase, and a second phoneme sequence can be determined for the text transcription. The phonetic distance can then be determined based at least in part on the first and second phoneme sequences. For instance, the phonetic distance can be determined by determining a number of phonemes of the second phoneme sequence that are different from the first phoneme sequence (e.g. a number of phonemes from the second phoneme sequence that would need to be changed in order to match the first phoneme sequence).

If the phonetic distance is less than a predefined threshold, it can be determined that the input text phrase is phonetically similar to the text transcription. In this manner, it can be determined that the input text phrase is phonetically similar to the one or more test phrases. If the phonetic distance is greater than the threshold, it can be inferred that the input text phrase is phonetically distinct from the plurality of test phrases. In some implementations, if the phonetic distance is greater than the threshold, the entire process can be performed again.

Determining phonetic relationships between phrases according to example aspects of the present disclosure can allow for such phonetic relationships to be determined real-time, or near real-time. In this manner, upon inputting an input text phrase to a user device, a user can be provided with an indication of the phonetic relationship between the input text phrase and the test phrases, for instance, within a user interface of the user device in real-time, or near real-time. Such phonetic relationship determination techniques can be performed using less processing resources, bandwidth, and/or data transmission compared to conventional phonetic relationship determination techniques. The time and resources required to determine phonetic relationships according to example aspects of the present disclosure are not dependent on the number of test phrases in the plurality of test phrases. In this manner, the plurality of test phrases can include any suitable number of test phrases without sacrificing the quality of the determination techniques. Further still, such phonetic relationship determination techniques do not rely on batch processing.

Figure 1:
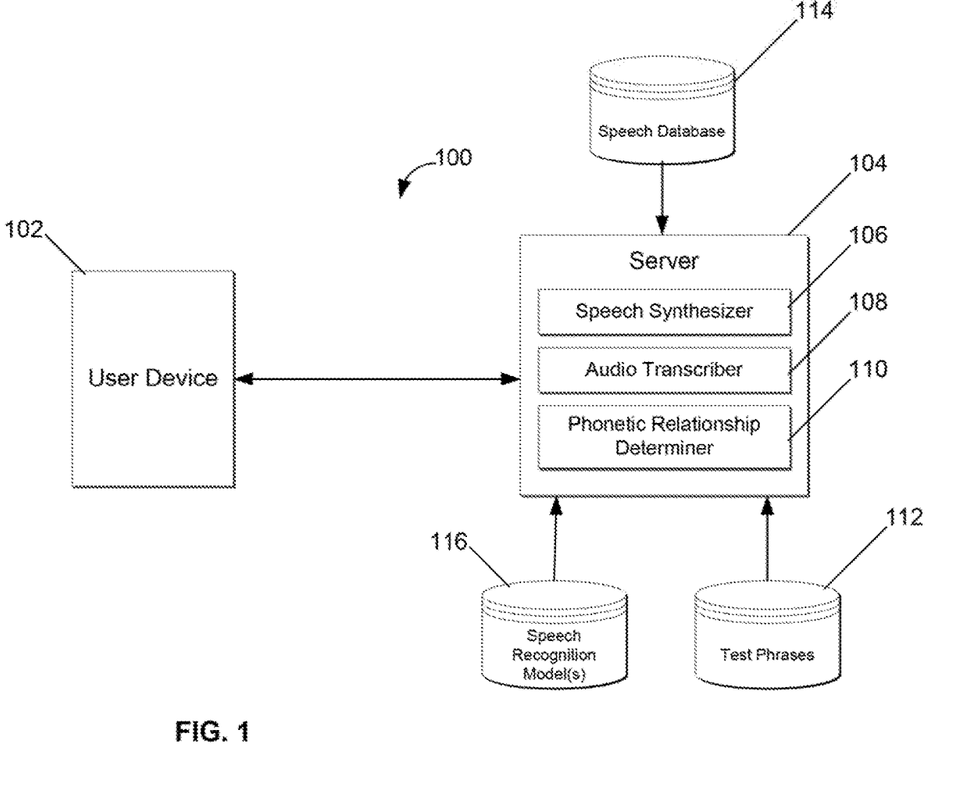
FIG. 1 depicts an overview of an example system for determining phonetic relationships according to example embodiments of the present disclosure.

With reference now to the figures, example aspects of the present disclosure will be discussed in greater detail. For instance, FIG. 1 depicts an overview of an example system 100 of determining a phonetic similarity between two or more phrases. System 100 includes a user device 102 and a server 104. The user device 102 can be any suitable user device, such as a smartphone, tablet, laptop computer, desktop computer, wearable computing device, or other suitable user device. Server 104 includes a speech synthesizer 106, an audio transcriber 108, and a phonetic relationship determiner 110. The user device 102 can communicated with the server 104, for instance, via a network. In some implementations, one or more functions associated with the speech synthesizer 106, the audio transcriber 108, and/or the phonetic relationship determiner 110 can be performed locally on the user device 102.

Figure 2:
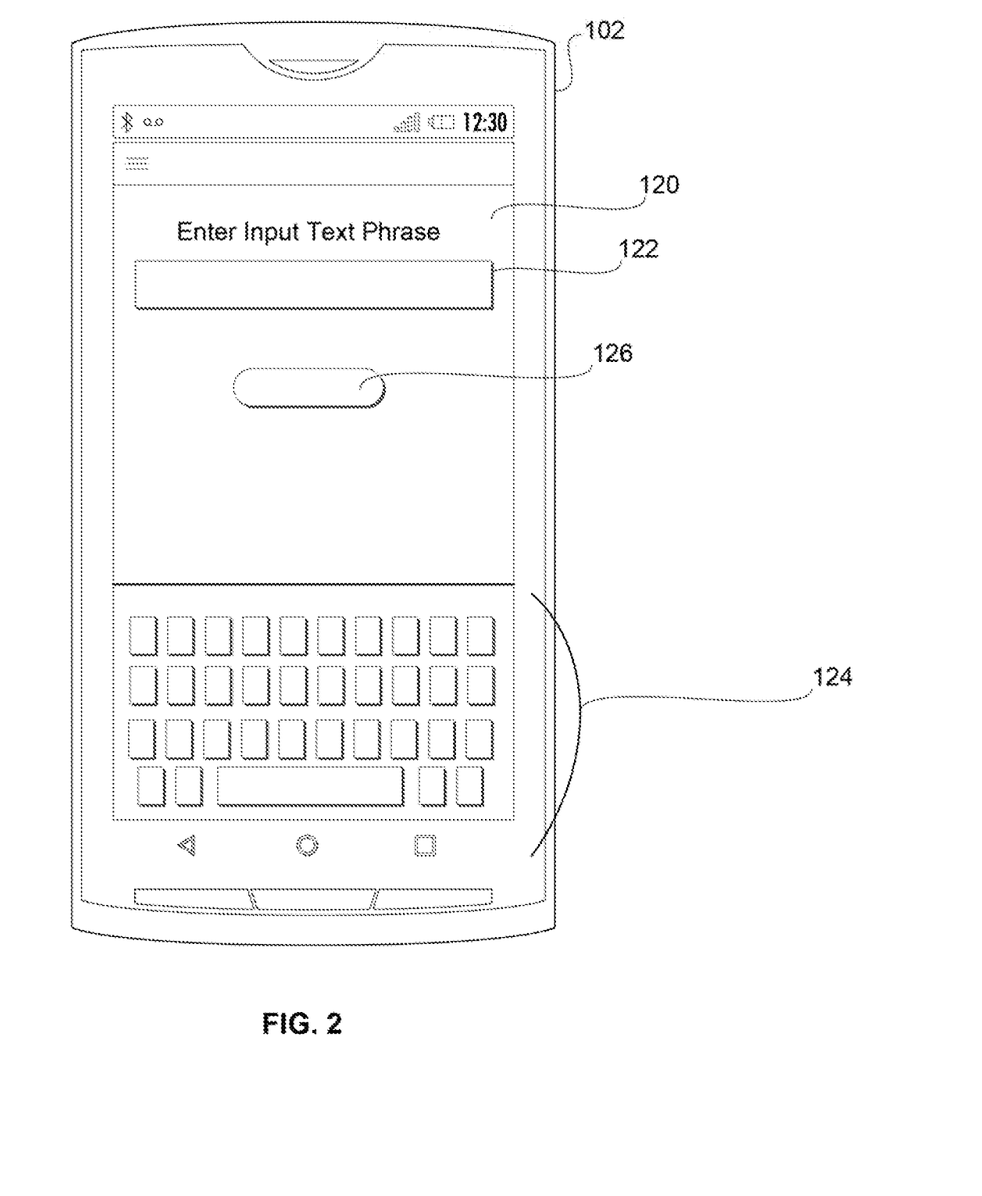
FIG. 2 depicts an example user interface according to example embodiments of the present disclosure.

The user device 102 can be configured to receive an input from the user indicative of an input text phrase. In particular, the user device 102 can be configured to display a user interface, for instance, on a display device associated with the user device. The user interface can prompt the user to input the input text phrase. For instance, FIG. 2 depicts an example user device 102 displaying an example user interface 120 according to example embodiments of the present disclosure. User interface 120 includes a text field 122 configured to receive a text input. The user can input the input text phrase into the text field 122, for instance, using a keyboard 124. The user can submit the request by interacting with a submit interface element 126 The keyboard 124 can be a touch keyboard displayed within the user interface 120. It will be appreciated that various other suitable input devices can be used, such as a physical keyboard, keypad, or other suitable input device.

Upon a determination of a phonetic relationship of the input text phrase and one or more test phrases (e.g. whether the input text phrase is phonetically distinct from, or phonetically similar to the one or more test phrases), the user interface 120 can be configured to provide an indication of the phonetic relationship to the user. For instance, in some implementations, the user interface can display a suitable indication that signifies the phonetic relationship.

Upon receiving the input text phrase from the user, the user device can provide data indicative of the input text phrase to the server 104. The server 104 can then determine whether the input text phrase is phonetically similar to one or more test phrases 112. For instance, referring back to FIG. 1, the speech synthesizer 106 can be configured to determine an audio output corresponding to a synthesized spoken rendering of the input text phrase. For instance, a playback of the audio output by an audio device can sound like a human voice speaking the word(s) of the input text phrase.

In particular, the speech synthesizer 106 can be configured to determine the audio output by determining a phonetic transcription of the input text phrase. As indicated, the phonetic transcription can include a sequence of phonetic speech units, each corresponding to an acoustic representation of a segment of speech associated with the input text phrase. In some implementations, the phonetic transcription can be accompanied by contextual information that indicates proper and/or intended speech rendering of the phonetic speech units of the phonetic transcription. For instance, the contextual information can include relative positions of identified phonemes within an input sequence (e.g. left context, right context, etc.). The contextual information can further include timing information to indicate intended durations of acoustic renderings of identified phonemes, and intended relative timing positions of phonemes within more extended waveforms. The context information can further include state information to indicate acoustic phases of the phonemes.

The speech synthesizer 106 can map the phonetic transcription to one or more predicted feature vectors, for instance, based at least in part on the contextual information associated with the phonetic transcription. The speech synthesizer 106 can generate a set of predicted feature vectors corresponding to the phonetic transcription based at least in part on the mappings. The predicted feature vectors can include acoustic metrics that determine acoustic properties of a corresponding waveform. In this manner, the predicted feature vectors can be translated to a waveform corresponding to the audio output. By way of example, feature vectors can include various suitable acoustic metrics, such as Mel-Cepstral Coefficients, Line Spectral pairs, Linear Predictive coefficients, Mel-Generalized Cepstral Coefficients, fundamental frequency (f0), aperiodic measures, log power spectrum, or phase.

As indicated, the speech synthesizer 106 can translate the feature vectors to an audio output waveform that corresponds to a spoken rendering of the input text phrase. In some implementations, the speech synthesizer can determine the audio output by mapping the feature vectors to predefined speech waveform segments stored in a speech database 114. It will be appreciated that the speech synthesizer 106 can use various suitable speech synthesis techniques to map the phonetic transcription to the audio output, such as for instance, concatenation synthesis, unit selection synthesis, diphone synthesis, domain-specific synthesis, format synthesis, articulatory synthesis, hidden Markov models (HMM) based synthesis, sinewave synthesis, and/or other suitable speech synthesis techniques.

In some implementations, the audio output can be determined using various parameters, such as various suitable voices, speech sampling rates, etc. In this manner, the speech synthesizer 106 can control the fidelity of the audio output by adjusting such parameters.

Upon a determination of the audio output, the audio transcriber 108 can be configured to determine a text transcription of the audio output using one or more suitable speech recognition techniques. In particular the audio transcriber 108 can be configured to segment the audio output waveform into a plurality of segments, and to extract a plurality of feature vectors from the plurality of segments. The audio transcriber 108 can then generate a word sequence from the feature vectors based at least in part on one or more speech recognition models 116. The one or more speech recognition models can include one or more acoustic models (e.g. HMMs, neural networks, segmental models, super segmental models, maximum entropy models, conditional random fields, etc.), and one or more language models (e.g. grammar, n-grams language model, stochastic language model, etc.). The acoustic model(s) can specify statistical properties of the audio output. The language model(s) can specify probability estimates of the occurrence of words, for instance, given one or more previously determined words. As will be understood by those skilled in the art, the audio transcriber 108 can determine a sequence of one or more words based at least in part on the speech recognition model(s) 116, such that the determined sequence of words has the maximum posterior probability for the input feature vectors. For instance, in some implementations, the acoustic transcriber 108 can determine the sequence of words using a Viterbi decoder.

In some implementations, the speech recognition model(s) 116 can include a general language model and a biased language model. In this manner, the audio transcriber 108 can determine the text transcription based at least in part on the general language model and/or the biased language model. As indicated, the biased language model can be determined based at least in part on the general language model, for instance, by increasing the probability estimates associated with the plurality of test phrases 112 relative to the probability estimates of the plurality of test phrases 112 as specified in the general language model. In this manner, in some implementations, the text transcription can be determined based at least in part on the biased language model.

In some implementations, the audio transcriber 108 can determine a first transcription using the general language model and a second transcription using the biased language model. The audio transcriber 108 can further determine a first confidence recognition score for the first transcription and a second confidence recognition score for the second transcription. Either the first transcription or the second transcription can be selected based at least in part on the confidence scores. In some implementations, one or more additional transcriptions can be determined using one or more additional language models. The additional transcriptions can have accompanying confidence recognition scores, such that the selected transcription is determined based at least in part on the confidence recognition scores. In some implementations, multiple transcriptions can be selected based to accommodate alternate spellings of words.

Upon a determination of the text transcription of the audio output, the phonetic similarity determiner 110 can compare the one or more words of the text transcription against the plurality of test phrases 112 to determine a match between the text transcription and one or more test phrases. If a match is determined, the phonetic relationship determiner 110 can determine that the input text phrase is phonetically similar to the one or more test phrases. If no match is determined, the phonetic relationship determiner 110 can determine that the input text phrase is phonetically distinct from each test phrase.

In some implementations, if a direct match is determined between the text transcription and one or more test phrases, the phonetic relationship determiner 110 can determine a phonetic distance between the input text phrase and the text transcription of the audio output. In particular, the phonetic relationship determiner 110 can determine phonetic transcriptions for the input text phrase and the text transcription. The phonetic transcriptions can include a sequence of phonetic speech units respectively representing the input text phrase and the text transcription. For instance, the phonetic relationship determiner 110 can determine a first phonetic transcription for the input text phrase and a second phonetic transcription for the text transcription. The phonetic relationship determiner 110 can then determine a phonetic distance based at least in part on the first and second phonetic transcriptions. The phonetic distance can be a quantification of how dissimilar the text transcription is from the input text phrase. The phonetic relationship determiner 110 can determine the phonetic distance by determining a number of phonetic speech units in the second phonetic transcription that are different from the first phonetic transcription.

If the phonetic distance is less than a predetermined threshold, the phonetic relationship determiner 110 can determine that the text transcription is phonetically similar to the input text phrase, and that therefore, the input text phrase is phonetically similar to the one or more test phrases to which the text transcription was matched. If the phonetic distance is greater than the threshold, the phonetic relationship determiner 110 can determine that the text transcription is not phonetically similar to the input text phrase, and that therefore, the input text phrase is phonetically distinct from the plurality of test phrases 112.

Upon a determination of the phonetic relationship between the input text phrase and the one or more test phrases, the server 104 can provide an indication to the user device 102 of the phonetic relationship. For instance, the server 104 can provide one or more signals to the user device 102 indicative of the phonetic relationship. As an example, if it is determined that the input text phrase is phonetically distinct from each test phrase, the one or more signals can indicate that the input text phrase is phonetically distinct. In implementations, wherein the phonetic relationship determination techniques are associated with a voice command verification system, the one or more signals can include an indication that the proposed voice command (e.g. the input text phrase) is phonetically distinct from the reserved voice commands, and/or that the proposed voice command is authorized for use. The user device 102 can then provide an indication to the user of the phonetic relationship. For instance, the user device 102 can present the indication to the user within the user interface 120 depicted in FIG. 2.

Figure 3:
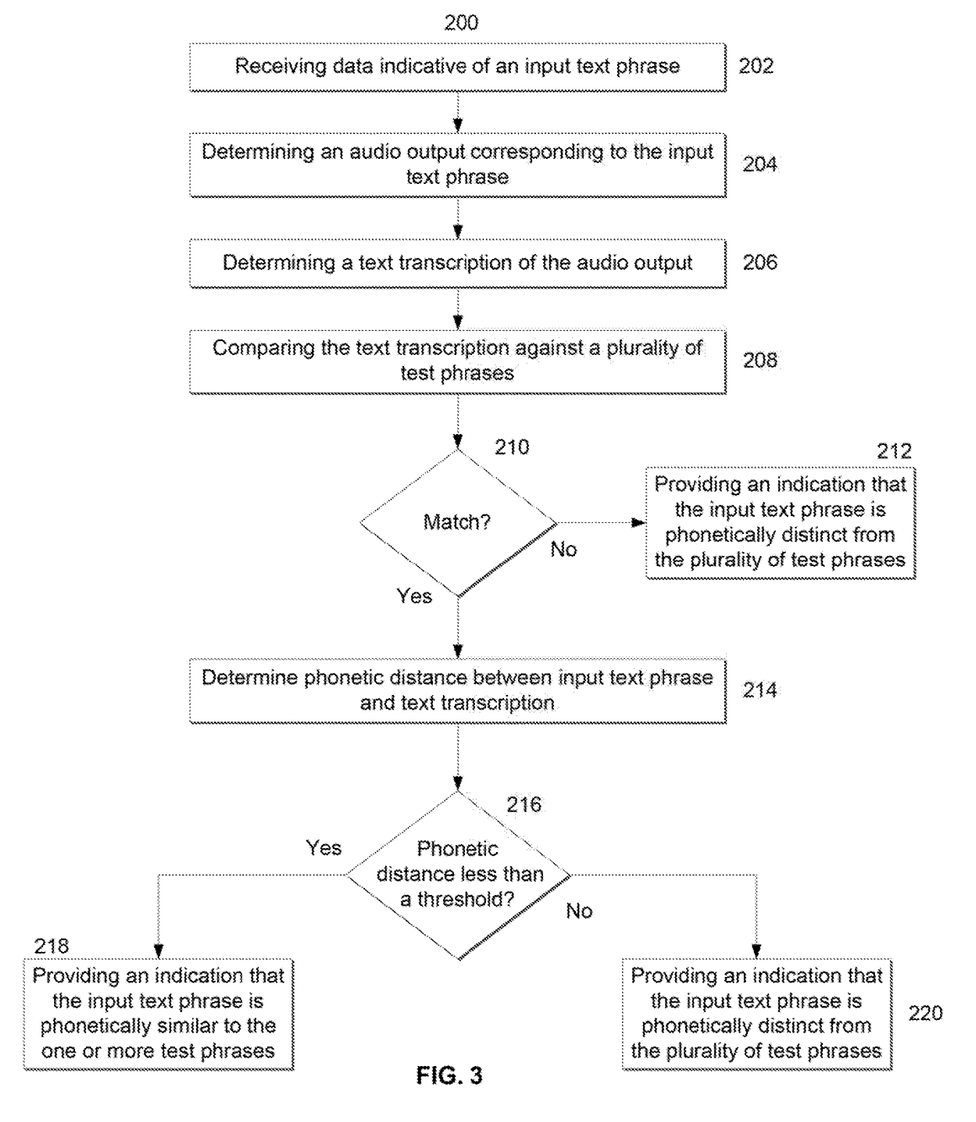
FIG. 3 depicts a flow diagram of an example method of determining phonetic relationships according to example embodiments of the present disclosure.

FIG. 3 depicts a flow diagram of an example method (200) of determining a phonetic relationship between two or more phrases. Method (200) can be implemented by one or more computing devices, such as one or more of the computing devices depicted in FIG. 4. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include receiving data indicative of an input text phrase. The input text phrase can be input by a user, for instance, on a user device using various suitable text input techniques. The input text phrase can be a sequence of one or more words that the user wishes to be compared against a plurality of test phrases to determine a phonetic relationship between the input text phrase and the test phrases. The phonetic relationship can indicate whether the input text phrase is phonetically distinct from or phonetically similar to the test phrases.

At (204), method (200) can include determining an audio output corresponding to the input text phrase. In particular, the audio output can be a waveform corresponding to a spoken rendering of the input text phrase. For instance, a playback of the audio output can sound like a human voice speaking the word(s) of the input text phrase. The audio output can represent a phonetic pronunciation of the input text phrase. In this manner, the phonetic pronunciation can be independent of the spelling of the word(s) included in the input text phrase. The audio output can be determined using any suitable speech synthesis technique. The audio output can be stored as any suitable audio file suitable for audio playback. In this manner, the audio waveform can be generated as an audio file that may be stored or recorded on storage media suitable for subsequent playback.

At (206), method (200) can include determining a text transcription of the audio output. The text transcription can be a representation of the audio output in textual form. In some instances, one or more words text transcription can have alternative spellings to the corresponding word(s) in the input text phrase. For example, the text transcription can be determined to include alternative spellings of the one or more words based on the input text phrase. The text transcription can be determined using any suitable speech recognition technique. For instance, the text transcription can be determined using one or more acoustic models and/or one or more language models. As indicated, the one or more language models can include a general language model and/or a biased language model. The biased language model can be generated based at least in part on the general language model and the plurality of test phrases.

At (208), method (200) can include comparing the text transcription against a plurality of test phrases. For instance, comparing the text transcription against the test phrases can include searching the test phrases to determine whether the text transcription matches one or more of the test phrases. At (210), method (200) can include determining whether the text transcription matches one or more of the test phrases. If the text transcription does not match any of the test phrases, at (212), method (200) can include providing an indication that the input text phrase is phonetically distinct from the plurality of test phrases.

If the text transcription matches one or more of the test phrases, at (214), method (200) can include determining a phonetic distance between the input text phrase and the text transcription. As indicated, determining the phonetic distance can include determining phonetic transcriptions associated with the input text phrase and the text transcription, and comparing the phonetic transcriptions to determine one or more phonetic speech units that are different. In this manner, the phonetic distance can be indicative of a number of phonetic speech units associated with the text transcription that are different from the corresponding phonetic speech units associated with the input text phrase.

At (216), method (200) can include determining whether the phonetic distance is less than a predefined phonetic distance threshold. If the phonetic distance is less than (or equal to) the threshold, at (218), method (200) can include providing an indication that the input text phrase is phonetically similar to the text transcription and/or the one or more test phrases. If the phonetic distance is greater than the threshold, at (220), method (200) can include providing an indication that the input text phrase is phonetically distinct from the plurality of test phrases.

In some implementations, if, at (210), a match is determined between the text transcription and one or more test phrases, method (200) can bypass (214) and (216), and can proceed directly to (218). In this manner, the upon a determination of a match between the text transcription and the one or more test phrases, it can be determined that the input text phrase is phonetically similar to the one or more test phrases without having to determine the phonetic distance between the input text phrase and the text transcription.

Figure 4:
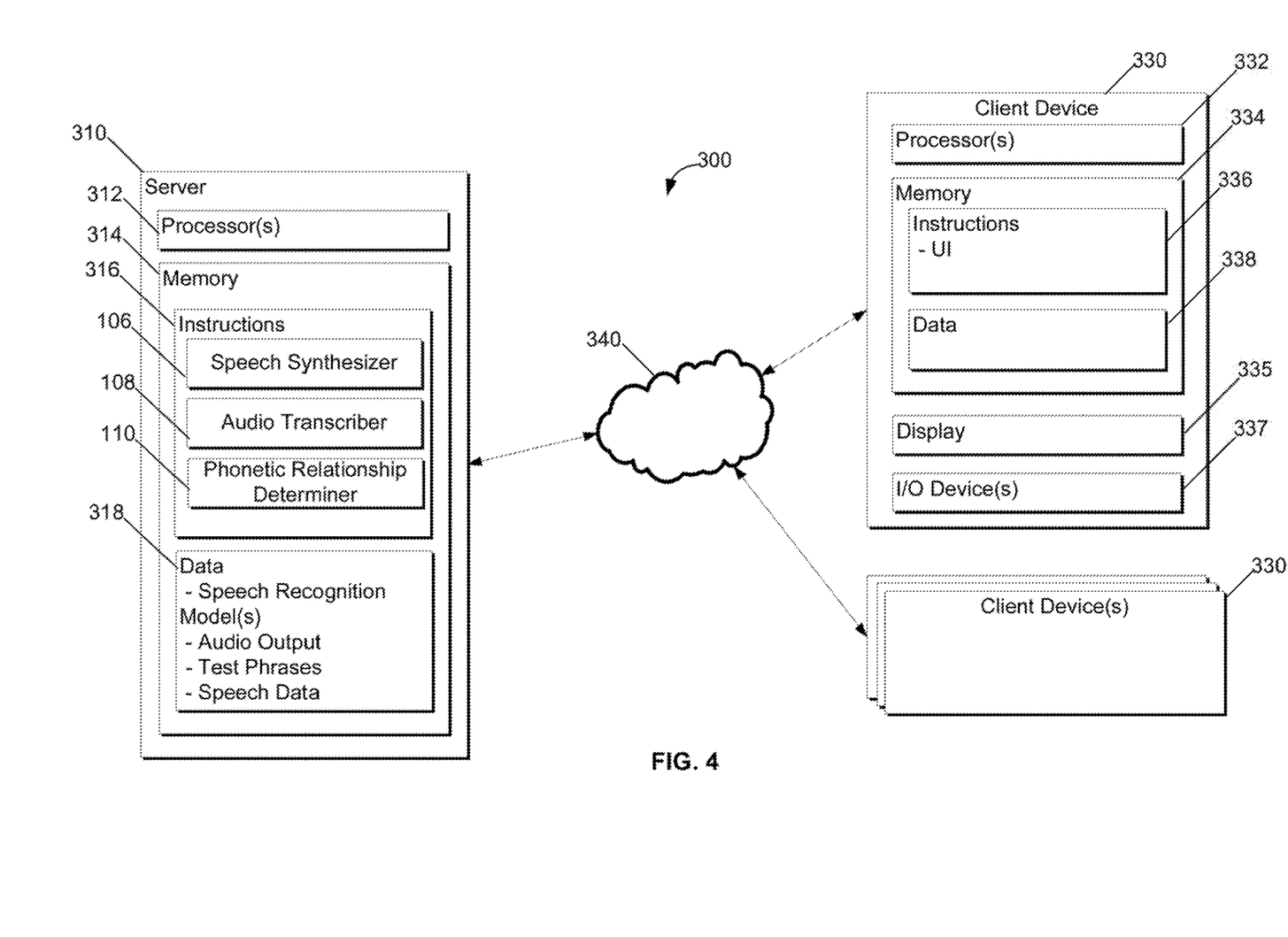
FIG. 4 depicts an example system according to example embodiments of the present disclosure.

FIG. 4 depicts an example computing system 300 that can be used to implement the methods and systems according to example aspects of the present disclosure. The system 300 can be implemented using a client-server architecture that includes a server 310 that communicates with one or more client devices 330 over a network 340. The system 300 can be implemented using other suitable architectures, such as a single computing device.

The system 300 includes a server 310, such as a web server. The server 310 can be implemented using any suitable computing device(s). The server 310 can have one or more processors 312 and one or more memory devices 314. The server 310 can also include a network interface used to communicate with one or more client devices 330 over the network 340. The network interface can include any suitable components for interfacing with one more networks, including for example, transmitters, receivers, ports, controllers, antennas, or other suitable components.

The one or more processors 312 can include any suitable processing device, such as a microprocessor, microcontroller, integrated circuit, logic device, or other suitable processing device. The one or more memory devices 314 can include one or more computer-readable media, including, but not limited to, non-transitory computer-readable media, RAM, ROM, hard drives, flash drives, or other memory devices. The one or more memory devices 314 can store information accessible by the one or more processors 312, including computer-readable instructions 316 that can be executed by the one or more processors 312. The instructions 316 can be any set of instructions that when executed by the one or more processors 312, cause the one or more processors 312 to perform operations. For instance, the instructions 316 can be executed by the one or more processors 312 to implement the speech synthesizer 106, the audio transcriber 108, and/or the phonetic relationship determiner 110 described with reference to FIG. 1.

As shown in FIG. 4, the one or more memory devices 314 can also store data 318 that can be retrieved, manipulated, created, or stored by the one or more processors 312. The data 318 can include, for instance, one or more speech recognition models, audio output data, a plurality of test phrases, speech data, and other data. The data 318 can be stored in one or more databases. The one or more databases can be connected to the server 310 by a high bandwidth LAN or WAN, or can also be connected to server 310 through network 340. The one or more databases can be split up so that they are located in multiple locales.

The server 310 can exchange data with one or more client devices 330 over the network 340. Although two client devices 330 are illustrated in FIG. 4, any number of client devices 330 can be connected to the server 310 over the network 340. Each of the client devices 330 can be any suitable type of computing device, such as a general purpose computer, special purpose computer, laptop, desktop, mobile device, navigation system, smartphone, tablet, wearable computing device, a display with one or more processors, or other suitable computing device.

Similar to the server 310, a client device 330 can include one or more processor(s) 332 and a memory 334. The one or more processor(s) 332 can include one or more central processing units (CPUs), graphics processing units (GPUs) dedicated to efficiently rendering images or performing other specialized calculations, and/or other processing devices. The memory 334 can include one or more computer-readable media and can store information accessible by the one or more processors 332, including instructions 336 that can be executed by the one or more processors 332 and data 338. For instance, the memory 334 can store instructions 336 for implementing a user interface, such as user interface 120 depicted in FIG. 2.

The client device 330 of FIG. 4 can include various input/output devices 337 for providing and receiving information from a user, such as a touch screen, touch pad, data entry keys, speakers, and/or a microphone suitable for voice recognition. For instance, the client device 330 can have a display device 335 for presenting a user interface, such as the user interface 120 depicted in FIG. 2.

The client device 330 can also include a network interface used to communicate with one or more remote computing devices (e.g. server 310) over the network 340. The network interface can include any suitable components for interfacing with one more networks, including for example, transmitters, receivers, ports, controllers, antennas, or other suitable components.

The network 340 can be any type of communications network, such as a local area network (e.g. intranet), wide area network (e.g. Internet), cellular network, or some combination thereof. The network 340 can also include a direct connection between a client device 330 and the server 310. In general, communication between the server 310 and a client device 330 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining a phonetic relationship between two or more phrases, the method comprising:

receiving, by one or more computing devices, data indicative of an input text phrase by a user;

determining, by the one or more computing devices, an audio output corresponding to a synthesized spoken rendering of the input text phrase;

determining, by the one or more computing devices, a text transcription of the audio output of the input text phrase, the text transcription comprising a textual representation of the audio output;

comparing, by the one or more computing devices, the text transcription against a plurality of test phrases;

identifying, by the one or more computing devices and based at least in part on the comparing, a match between the text transcription and a test phrase of the plurality of test phrases; and responsive to identifying the match, determining, by the one or more computing devices, a phonetic distance between the text transcription of the audio output and the input text phrase, wherein determining the phonetic distance is based on a first phonetic transcription associated with the input text phrase and a second phonetic transcription associated with the text transcription.

2. The computer-implemented method of claim 1, further comprising, responsive to identifying the match, providing, by the one or more computing devices, an indication that the input text phrase is phonetically similar to the test phrase.

3. The computer-implemented method of claim 1, further comprising, when the phonetic distance between the text transcription and input text phrase is less than a threshold, providing, by the one or more computing devices, an indication that the input text phrase is phonetically similar to the test phrase.

4. The computer-implemented method of claim 1, wherein determining the phonetic distance based on the first and second phonetic transcriptions comprises:

determining, by the one or more computing devices, the first and second phonetic transcriptions, the first and second phonetic transcriptions each comprising a plurality of phonetic speech units; and determining, by the one or more computing devices, a number of phonetic speech units in the second phonetic transcription that are different from the first phonetic transcription.

5. The computer-implemented method of claim 1, wherein determining, by the one or more computing devices, the text transcription of the audio output of the input text phrase comprises determining the text transcription based at least in part on one or more language models.

6. The computer-implemented method of claim 5, wherein the one or more language models comprise a biased language model determined based at least in part on a general language model and the plurality of test phrases.

7. The computer-implemented method of claim 1, wherein the audio output of the text input phrase comprises a speech waveform corresponding to the synthesized spoken rendering of the input text phrase.

8. The computer-implemented method of claim 1, wherein determining the audio output corresponding to the synthesized spoken rendering of the input text phrase comprises:

using speech synthesis to convert the input text phrase to the audio output.

9. The computer-implemented method of claim 1, wherein the user is a developer of a computing application, and wherein the computing application is associated with a computing platform.

10. The computer-implemented method of claim 9, wherein the plurality of test phrases include at least a list of reserved voice commands for the computing platform.

11. A computing system, comprising:
one or more processors; and
one or more memory devices, the one or more memory devices storing computer-readable instructions that when executed by the one or more processors cause the one or more processors to perform operations, the operations comprising:

receiving data indicative of an input text phrase input by a user;

determining an audio output corresponding to a synthesized spoken rendering of the input text phrase;

determining a text transcription of the audio output of the input text phrase, the text transcription comprising a textual representation of the audio output;

comparing the text transcription against a plurality of test phrases;

identifying, based at least in part on the comparing, a match between the text transcription and a test phrase of the plurality of test phrases; and responsive to identifying the match, determining a phonetic distance between the text transcription of the audio output and the input text phrase, wherein determining the phonetic distance is based on a first phonetic transcription associated with the input text phrase and a second phonetic transcription associated with the text transcription.

12. The computing system of claim 11, the operations further comprising, responsive to identifying the match, providing an indication that the input text phrase is phonetically similar to the test phrase.

13. The computing system of claim 11, the operations further comprising, when the phonetic distance between the text transcription and the input text phrase is less than a threshold, providing an indication that the input text phrase is phonetically similar to the test phrase.

14. The computing system of claim 11, wherein the operations, in determining a the phonetic distance based on the first and second phonetic transcriptions, further comprising:

determining the first and second phonetic transcriptions, the first and second phonetic transcriptions each comprising a plurality of phonetic speech units; and determining a number of phonetic speech units in the second phonetic transcription that are different from the first phonetic transcription.

15. One or more tangible, non-transitory computer-readable media storing computer-readable instructions that when executed by one or more processors cause the one or more processors to perform operations, the operations comprising:

receiving data indicative of an input text phrase input by a user;

determining an audio output corresponding to a synthesized spoken rendering of the input text phrase;

determining a text transcription of the audio output of the input text phrase, the text transcription comprising a textual representation of the audio output;

comparing the text transcription against a plurality of test phrases;

identifying, based at least in part on the comparing, a match between the text transcription and a test phrase of the plurality of test phrases; and responsive to identifying the match, determining a phonetic distance between the text transcription of the audio output and the input text phrase, wherein determining the phonetic distance is based on a first phonetic transcription associated with the input text phrase and a second phonetic transcription associated with the text transcription.

* * * * *